O. DIEFFENBACH & W. MOLDENHAUER.
ELECTRIC FURNACE FOR GAS REACTIONS.
APPLICATION FILED AUG. 25, 1908.
941,768.  Patented Nov. 30, 1909.
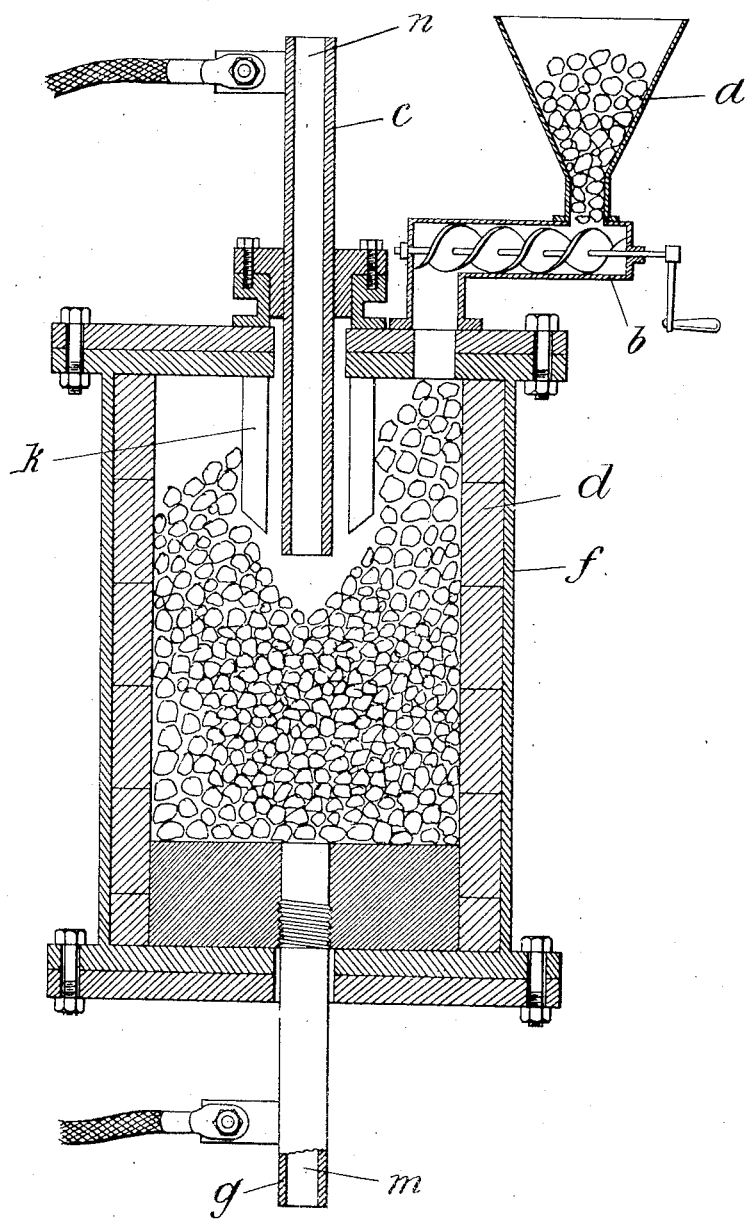
Witnesses:
Inventors:

UNITED STATES PATENT OFFICE.

OTTO DIEFFENBACH AND WILHELM MOLDENHAUER, OF DARMSTADT, GERMANY.

ELECTRIC FURNACE FOR GAS REACTIONS.

941,768.  Specification of Letters Patent.  Patented Nov. 30, 1909.

Application filed August 25, 1908. Serial No. 450,200.

*To all whom it may concern:*

Be it known that we, OTTO DIEFFENBACH, doctor of philosophy, professor at the technical high-school at Darmstadt, and WILHELM MOLDENHAUER, doctor of philosophy, lecturer at the technical high-school at Darmstadt, and residents of Darmstadt, in the Grand Duchy of Hesse, Germany, (the post-office address of OTTO DIEFFENBACH is Ohlystrasse No. 71, that of WILHELM MOLDENHAUER Lucasweg No. 19) have invented new and useful Improvements in Electrical Furnaces for Gas Reactions, of which the following is a specification.

It is well known that by passing a mixture of nitrogen and hydrogen through an electric arc produced between two carbon electrodes, combination of the said gases with the carbon volatilized in the arc to form hydrocyanic acid takes place. In practice when it is attempted to carry on this process on a large scale, it is found that in order to obtain any large quantity of hydrocyanic acid it is necessary to pass the gases at a comparatively slow rate through the arc, since if they are passed rapidly through it, they do not become sufficiently highly heated. In order to obtain good results therefore it is a distinct advantage to submit the gases to a preliminary heating so as to raise them to a high temperature before they enter the arc, and this may be best effected in the following manner. If, instead of producing the arc by passing a current from a suitable direct current or alternating current generator between two carbon rods, only the upper, vertically-placed electrode be a carbon rod, while the lower one is constituted by a more or less deep stratum of unformed lumps of coke, then the arc will heat the upper layer of coke to a very high temperature, and also the more deeply situated layers become heated by conduction, and since they themselves offer considerable resistance to the passage of the current, they become heated to strong incandescence. If now the mixture of nitrogen and hydrogen be caused to pass through this incandescent stratum of coke before it enters the arc, it will thereby undergo a preliminary heating whereby it will become raised to a very high temperature, so that when it enters the zone of the arc, it will become much more rapidly raised to the required maximum of temperature than would be the case if there were no such preliminary heating. Moreover, by the employment of unformed carbon as the lower electrode, a form of arc is produced which is very well adapted to the requirements of the process.

In the case of a pair of carbon rods the arc springs principally across a comparatively restricted area, and moreover it frequently changes its standpoint and thereby renders it difficult to make the gases pass through the arc at all. Whereas on the other hand, if the lower electrode is constituted by a stratum of sufficiently small lumps of coke, the arc then assumes a form in which, in passing from the upper to the lower electrode it spreads out conically so as to cover the whole surface of the lower electrode, provided that this is not too widely distributed. Consequently all the gases which escape upwardly from the coke stratum are compelled to pass through some portion of the arc, more particularly if the upper electrode be constituted by a carbon tube whereby an extended passage is provided for the gases, and through which tube the gases may be conducted out of the furnace, after their passage through the arc.

It is true that suggestions have already been made for the management of electrical furnaces, according to which the gases are supplied to the latter, but both the means employed, and the object of these apparatus differ totally from those which are dealt with according to the present invention. For instance in British Patent No. 1984 of 1898 a resistance furnace for the production of carbid is described, in which with the object of obtaining an elevation of temperature in the furnace, air for the combustion of the carbon monoxid produced is forced in, the gas entering at the periphery, and traversing the charge of coke and lime, and escaping upwardly from the layer at points whose position is neither determinate nor essential for obtaining successful results. On the other hand, according to the present invention as above pointed out, the gas is, for the purpose of submitting it to a preliminary heating, blown in at the lower region of the coke stratum, and compelled to leave the furnace exclusively by way of the heating chamber. Against the heating effect obtained by the blowing in of the gases, according to the British Patent 1984 of 1898 must be set firstly the cooling effect which the incoming fresh gases produce on the heated coke, and secondly the considerable absorption of heat which takes place in consequence of the endothermic nature of the reaction produced.

No other electrical furnaces for the conduct of gas reactions have been known hitherto, and still less therefore the phenomenon of the spreading out of the arc, when unformed coke is employed for the one electrode. Experiments specially carried out with both continuous and alternating currents have shown that the production of this conical shape of the arc is particularly favored if continuous current be employed in the furnace, the upper and lower electrodes being respectively cathode and anode. Furthermore, the tension of the current should preferably be kept low in accordance with the usual practice in electric arc furnaces. The experiments showed that in spite of the lateral spreading of the coke surface the heating effect exercised by the electric arc on the electrodes under these conditions is much greater in the case of the lower electrode, than in that of the upper, and that therefore the carbon vapor necessary for the formation of hydrocyanic acid is almost exclusively produced at the expense of the lower unformed electrode, while the upper or formed electrode is but slightly attacked. If, on the other hand reversed poles are employed (that is to say with the anode at the top) then a volatilization of carbon ensues which so far exceeds the quantity to be expected (compared with that for instance of the arc-lamp) that the process almost entirely loses its commercial value. Furthermore it has been found advantageous instead of employing as the lower electrode a coke-stratum having a flat surface, to use it in the form of a bowl so that it constitutes a more or less capacious heating chamber which furthermore closes directly on to a chamber inclosing the upper electrode, such chamber being formed of carbon or of other suitable refractory material. It is necessary that the entire heat of the arc be concentrated within this heating chamber so that both a maximum temperature and large quantities of volatilized carbon are already present in the chamber for the reception of the inflowing gases. This heated chamber, which serves also as electrode, can easily be renewed constantly and as fast as it suffers destruction by the volatilization of the carbon by feeding in fresh coke laterally and preferably from the outer side of the chamber surrounding the upper electrode, in such manner that the lumps of coke sliding down the natural angle of the recess fill up the space which has been vacated by the consumed coke. Here again the character of the present apparatus is clearly distinguished from the electric arc furnace of Ugrinow, German patent No. 118,051 which nevertheless presents a superficial resemblance to the present apparatus. In the case of the furnace referred to, the metallic heating chamber employed is intended to dissipate the heat produced, by conduction and radiation outwardly. The gas supply is constant and is not intended, in accordance with its nature, to take part in the reactions; whereas with the present invention the heat produced is intended to be concentrated on the heating chamber (after the manner of the generality of electro-chemical furnaces) and to be given up exclusively to the current of gas, with the object of producing a reaction. The carbon layer in the furnace for heating and boiling described in the German patent specification No. 118,051 serves merely for the protection of the metal and is intended to be as far as possible conserved and economized; whereas in the present case, the carbon serves for consumption in the gas reaction and its recharging necessitates therefore a specially constructed shaft furnace.

The furnace here described is suitable for use in the preparation of hydrocyanic acid in that case also, if previously produced hydrocarbons of suitable composition are used together with nitrogen as raw material. Similarly it may be used for other processes in which gas reactions are to be produced by the heat of the electric arc, in so far at least as the presence of gaseous carbon is necessary for, or at least not disadvantageous, to such processes, as for instance in the case of the production of acetylene from its elements, of cyanogen and of other endothermic compounds.

The annexed drawing represents in diagrammatic section the furnace herein described.

The furnace, constituted of fire-resisting material $d$ and of a metallic mantle $f$ carries upwardly the tubular electrode $c$ and underneath the tubular electrode $g$. The coke $a$ is fed in as required by means of a screw conveyer $b$. The gas enters at $m$ and escapes at $n$.

$k$ is the ring of fire-resisting material around whose outer wall the coke slides downwardly.

Now what we claim and desire to secure by Letters Patent is the following:

1. An electric arc furnace for producing gas-reactions, including two electrodes in said furnace, one of said electrodes being composed of a charge of fragmentary carbon, and means for supplying gas to the arc through said carbon, substantially as described.

2. An electric arc furnace for producing gas-reactions, including two electrodes in said furnace, one of said electrodes consisting of a charge of fragmentary carbon and the other electrode consisting of a tube substantially as described.

3. An electric arc furnace for producing gas-reactions, including an upper and a lower electrode in said furnace, said lower electrode being composed of a charge of fragmentary carbon, and means for supplying gas to the arc through said carbon substantially as described.

4. An electric arc furnace for producing gas-reactions, including an upper and a lower electrode in said furnace, said lower electrode being composed of a charge of fragmentary carbon and a tubular electrical terminal for the said lower electrode substantially as described.

5. An electric arc furnace for producing gas-reactions, including an upper and a lower electrode in said furnace, said lower electrode being composed of a charge of fragmentary carbon, and said upper electrode consisting of a tube of carbon substantially as described.

6. An electric arc furnace for producing gas-reactions, including an upper and a lower electrode in said furnace, said lower electrode being composed of a charge of fragmentary carbon and having an upper exposed surface and means for maintaining a bowl-shaped depression in the said upper exposed surface of said lower electrode substantially as described.

7. An electric arc furnace for producing gas-reactions, including an upper and a lower electrode in said furnace, said lower electrode being composed of a charge of fragmentary carbon, a mantle of refractory material surrounding said upper electrode and means for supplying fresh charges of carbon to said furnace, substantially as described.

8. An electric arc furnace for producing gas-reactions, including an upper and a lower electrode in said furnace, said lower electrode being composed of a charge of fragmentary carbon, a mantle of refractory material surrounding said upper electrode and a screw-conveyer for supplying fresh charges of carbon to said furnace substantially as described.

9. Apparatus for producing gas-reactions by submitting gases to the action of the electric arc, comprising an electric furnace, upper and lower electrodes in said furnace, said lower electrode consisting of a charge of fragmentary carbon; and a source of continuous current electric supply, said source having its positive and negative terminals respectively connected to said lower and upper electrodes substantially as described.

In testimony, that we claim the foregoing as our invention, we have signed our names in presence of two witnesses, this eleventh day of August, 1908.

OTTO DIEFFENBACH.
WILHELM MOLDENHAUER.

Witnesses:
 KARL WEBER,
 PETER BRODAL.